United States Patent [19]

Morris et al.

[11] 4,286,700
[45] Sep. 1, 1981

[54] MOTORCYCLE THROTTLE CONTROL

[76] Inventors: James E. Morris, 18814 Cedar Valley Way; Bobby J. Myers, 26330 Ridgevale Dr., both of Newhall, Calif. 91321

[21] Appl. No.: 90,192

[22] Filed: Nov. 1, 1979

[51] Int. Cl.³ .............................................. B60K 41/20
[52] U.S. Cl. ......................................... 192/1; 74/488; 74/504
[58] Field of Search ............... 192/1, 3 M, 0.084, 3 T; 74/488, 504, 535, 536; 280/289 H

[56] References Cited

U.S. PATENT DOCUMENTS

| | | | |
|---|---|---|---|
| 1,185,467 | 5/1916 | Beauchamp | 74/488 |
| 1,473,326 | 3/1923 | Slawienski | 74/489 |
| 2,776,579 | 1/1957 | Nichel | 74/488 |
| 3,982,446 | 9/1976 | Van Dyken | 74/488 |
| 4,137,793 | 2/1979 | Sowell | 74/488 |

FOREIGN PATENT DOCUMENTS 216373 7/1961 Austria ........................................ 74/489

Primary Examiner—George H. Krizmanich
Attorney, Agent, or Firm—Warren T. Jessup

[57] ABSTRACT

A motorcycle throttle control comprised of a housing clamped to the throttle handle grip of a motorcycle having a locking arm adapted to engage a cog section mounted on the handle bar adjacent to the throttle handle grip. The cog section is rigidly fixed on the handle bar while the locking arm and housing rotate with the throttle handle grip. The locking arm has biasing means biasing it into engagement with the teeth of the cog section, locking the throttle handle grip at the position desired. The throttle control is released by disengaging the locking arm from the cog section.

9 Claims, 6 Drawing Figures

MOTORCYCLE THROTTLE CONTROL

BACKGROUND OF THE INVENTION

This invention relates to throttle controls, and more particularly relates to a throttle control for a motorcycle.

Operation of the throttle control on motorcycles presents a number of problems, particularly on open highways and long trips. Among these are those of fatigue caused by the effort used to overcome the effect of the throttle return spring. Additionally, there is the problem of maintaining constant speed. Because of the effect of the throttle return spring constant checking of the speedometer and adjustment of the throttle control is necessary to maintain anything resembling a steady speed. Even with a conscious effort to do so, maintaining such a constant speed is difficult. Further, the constant adjustment and distraction of trying to make a conscious effort to maintain a steady speed can contribute to fatigue and reduce safety. A number of methods have been posed to correct this deficiency. Some of them cause more problems than they cure. Among these are removal or stretching of the throttle return spring which, of course, can create serious hazards if speed needs to be reduced during an emergency. Solutions which relieve or counteract throttle spring tension, while effective, do nothing for helping the motorcyclist to maintain a steady speed.

SUMMARY OF THE INVENTION

The purpose of the present invention is to provide a throttle control which will permit setting of the throttle at a particular position to maintain a steady speed, while allowing quick safe release when needed.

The present invention is comprised of a housing which may be clamped on the throttle handle grip of a motorcycle which includes a locking arm for setting the throttle control. The locking arm is positioned to engage a cog section rigidly mounted on the handle bars on the light, horn, or other housing. The locking arm release drops the locking arm into engagement with the teeth of the cog section when the position of the throttle is at the desired speed setting. To increase the setting, the throttle handle is cranked open and the locking arm rides on the cog section according to a ratchet advance principle, locking at higher and higher settings. To reset the throttle at a lower speed, the locking arm is released from the cog section; the throttle is closed; and the locking arm is reset at the desired setting.

For safety purposes, several different methods for releasing the device are provided. These include a mechanical as well as electrical release and in addition the friction of the clamped housing can be overcome by twisting the throttle to the closed position. The locking arm would be constructed of a sufficiently bendable material that it would either break or bend, or the clamp on the throttle handle, if not excessively tightened, will slip in the handle allowing rotational force to overcome the friction of the throttle control.

The latter method would be used only in an emergency or panic situation as the clamp can be appropriately mounted to slip or the locking arm may be designed to bend away or fracture when sufficient force is applied.

It is one object of the present invention to provide a motorcycle throttle control which may be clamped onto the throttle handle.

Yet another object of the present invention is to provide a motorcycle throttle control which may be easily set.

Still another object of the present invention is to provide a motorcycle throttle control in which the setting may be increased without releasing a previous setting. Yet another object of the present invention is to provide a motorcycle throttle control which has a plurality of redundant release mechanisms for safety purposes.

These and other objects of the invention will become apparent from the following detailed description when considered in conjunction with the accompanying drawings wherein like numbers are used to identify like parts throughout.

DETAILED DESCRIPTION OF THE PREFERRED EMBODIMENT

Figure 1:
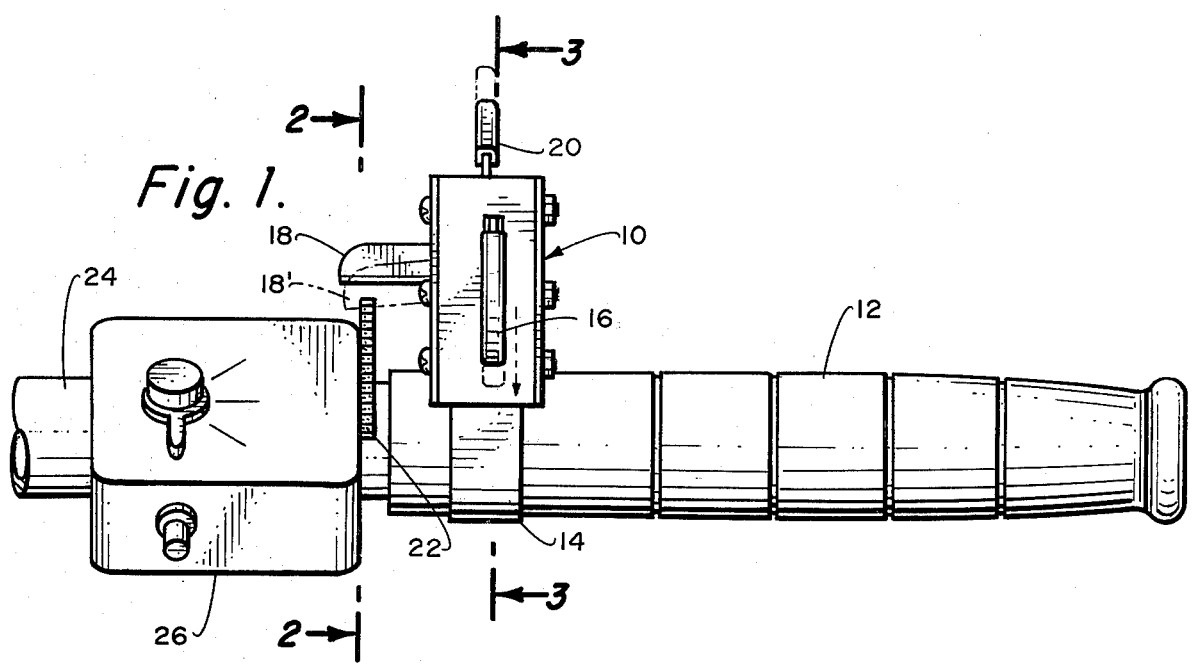
FIG. 1 is a side elevation showing the motorcycle throttle control installed on a model handle.
Figure 2:
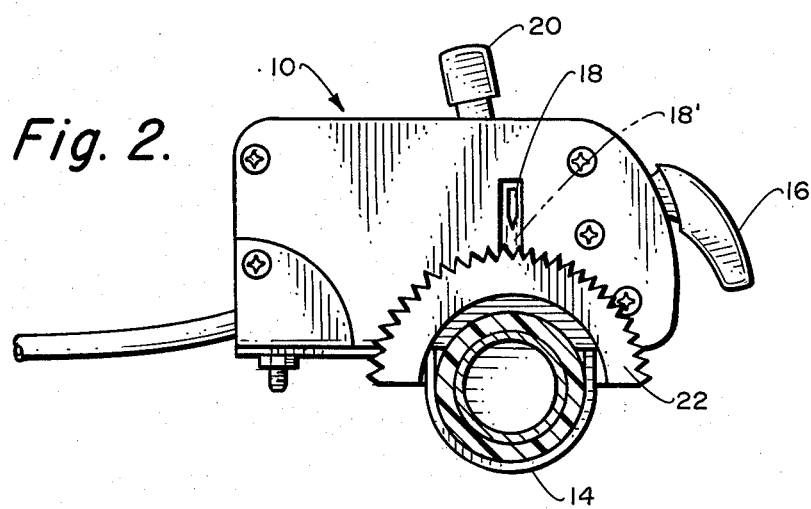
FIG. 2 is a sectional view of the throttle control taken at 2—2 of FIG. 1.

Referring to FIG. 1, there is shown a throttle control apparatus comprised of a main assembly housing 10 mounted on a throttle or accelerator handle grip 12 of the typical motorcycle. The throttle control housing 10 is secured to the handle grip 12 by means of a clamping strap 14. The throttle control housing 10 includes an actuating lever 16, a pivotally mounted locking arm 18, and a release button 20. The locking or speed setting arm 18 cooperates with a cog section 22 mounted on the handle 24 at an appropriate position. The cog 22 can be attached directly to the handle or mounted on the light, horn or starter switch housing 26 and secured with an epoxy cement or other suitable means. The cog section 22 can also be mounted on the mirror mounting frame and the particular mounting will depend upon the make or model of the motorcycle. It is only sufficient for the purposes of this invention that the cog section 22 be positioned for engagement by the locking or speed setting lever arm 18. The positioning of the throttle control housing 10 with respect to the cog section 22 can best be seen by reference to FIG. 2.

Figure 3:
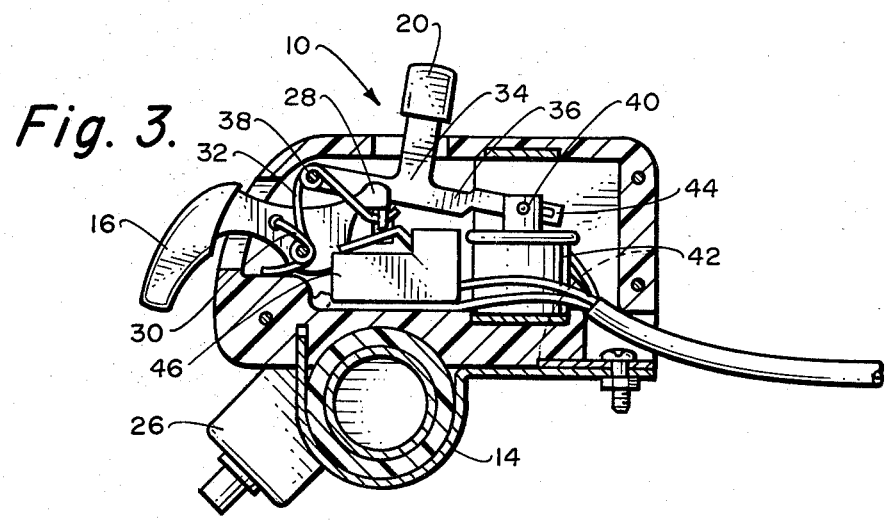
FIG. 3 is a sectional view of the throttle control housing taken at 3—3 of FIG. 1.

The actuation and operation of the throttle control can be seen in the sectional view of FIG. 3 which is a section through the throttle control housing 10. In FIG. 3 a throttle control is illustrated in a released position with a latch 28 on the end of actuating lever 16 engaging the end of the locking or speed setting lever arm 18, holding it in the disengaged position as illustrated in FIG. 1. The actuating lever latch 28 is held in position by actuating lever return spring 30, which keeps the latch 28 in engagement with the locking arm 18 until a speed is set with the throttle control. The locking arm 18 is operated by a locking arm spring 32 which biases the locking arm into engagement with the cog section 22. Thus, when actuating lever 16 is operated, disengaging latch 28 from the end of locking arm 18, locking arm spring 32 forces the end of the locking arm 18 into engagement with the cog section 22, as shown in phantom in FIGS. 1 and 2 at 18'.

Several methods for releasing the locking arm from the cog section 22 are provided. Release button 20 is connected by an arm 34 to release arm 36 for mechanically forcing locking arm 18 out of engagement with cog section 22. Thus, by pressing down on mechanical release button 20, locking arm release lever 36 forces the end of locking arm 18 downward, disengaging the locking arm from the cog section 22. When the locking arm moves downward, the latch 28, by means of actuating lever return spring 30, drops over the arm holding it in the released position.

Figure 4:
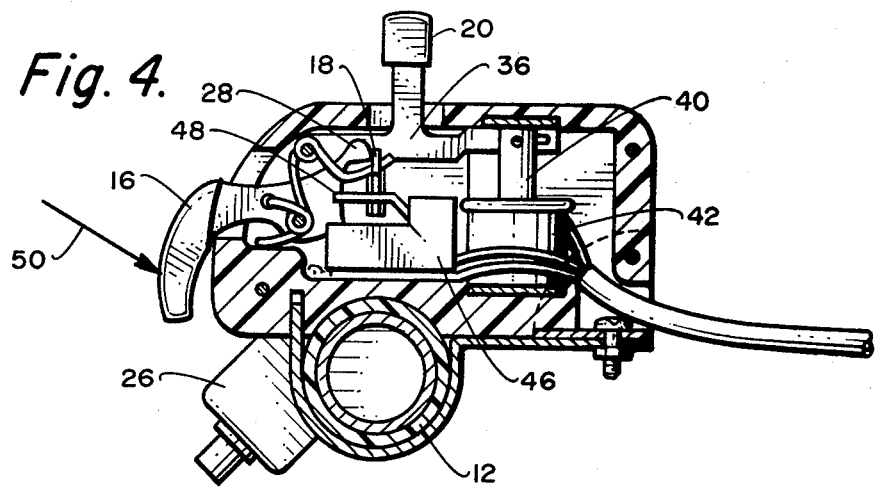
FIG. 4 is a sectional view similar to FIG. 3, illustrating the throttle control in the set position and having an electrically operated release mechanism.
Figure 6:
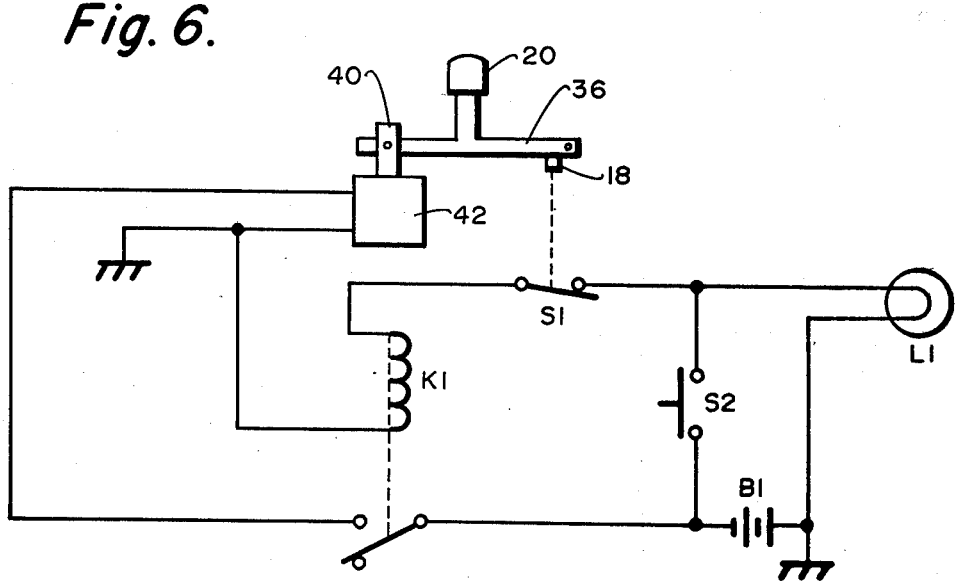
FIG. 6 is a schematic diagram illustrating the operation of the electrical release mechanism.

In addition to the mechanical release 20, an electrical release system is also shown in FIGS. 3 and 4, and the schematic of FIG. 6. The electrical release system is for operation in conjunction with the brake system or brake lights. The locking arm release lever 36 is pivoted at one end at 38 and connected to the actuator 40 of a solenoid 42 at the other end 44. Operation of the solenoid 42 causes the locking arm release lever 36 to pull downward in the same fashion as with the mechanical button 20, disengaging the locking arm 18 from the cog section 22. A microswitch 46 is provided to disengage electrical power from solenoid 42 when the throttle control is in the released position and will be described in greater detail hereinafter.

The operation of the throttle control is illustrated in FIG. 4. When the motorcycle rider wishes to set the throttle handle by means of the throttle handle grip 12 at a particular speed, the throttle handle grip is rotated to the desired speed and actuating lever 16 is pressed, as shown by the arrow at 50. This disengages the latch 28 from the end of the locking arm 18, allowing the opposite end of the locking arm to drop into engagement with the cog section 22. Throttle handle grip may now be released and will stay at the position set. If it is desired to increase the speed, rotation of the throttle handle grip 12 will cause the locking arm 18 to slide along the cog section 22 as in a ratchet advance mechanism, locking the throttle control at a higher speed. The locking arm 18 and cog section 22 operate in the same fashion as a ratchet assembly and will engage by actuating the throttle in one direction but must be disengaged to release the throttle.

To slow down or set the throttle control to a lower speed, the locking arm 18 must be disengaged from the cog section 22. This is accomplished by pressing with the thumb or hand on the locking arm release button 20, forcing the end of the locking arm 18 downward until the latch 28 drops over the arm, locking it in the released position.

A redundant release mechanism is provided with automatically functions with operation of the brake pedal or levers whichever the case may be. That is, operation of the brake of the motorcycle energizes solenoid 42, actuating rod 40, pulling down on the release lever 36, causing the locking arm 18 to engage the detent of latch 28. This is an automatic release for whenever the brakes are applied normally or in an emergency situation.

The operation of the automatic electrical release mechanism is shown schematically in FIG. 6. A solenoid 42 is connected through the contacts of a normally open relay K1 to the battery B1. The relay K1 is operated by energizing the brake switch S2 which applies voltage through microswitch S1 (46 in FIG. 4) to energize the coil K1, closing the contacts and energizing the solenoid 42 to release the locking arm 18. Since for obvious reasons it is not desirable to apply electric current through solenoid 22 every time the brakes are applied, a microswitch S1, which is normally closed, is provided and has a switching lever 48 for engagement by the end of the locking arm 18 to disconnect the relay K1 after the throttle control has been released. Thus, the brake light switch S2 can function normally to illuminate the brake light L1 in the normal manner. However, when the throttle control is in use, locking arm 18 is disengaged from the microswitch 46, returning it to the normally closed position, providing a path to relay K1. The system is now connected for release by operation of the brake switch S2 whenever the throttle control is being used. This provides an effective fail safe system.

As an alternative, a frictional or destructive release system may also be provided. This is accomplished by providing a connecting system for the clamping strap 14 which allows the strap to slip on the throttle handle grip 12 if not excessively tightened. As a further alternative, the locking arm 18 is constructed of a relatively bendable material such that a strong force applied to the throttle handle bar 12 will bend or break the lever arm, permitting the throttle to be closed. The lever arm, of course, would be constructed of a material which makes it strong enough to withstand a considerable amount of force and would only permit twisting or bending in an emergency or panic situation and will be designed to bend away when force is applied. Materials which would be suitable for this purpose would be brass or a soft steel.

Figure 5:
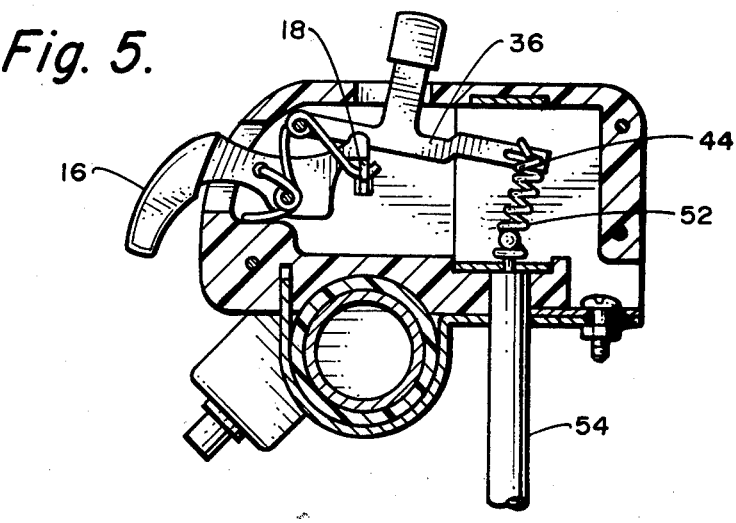
FIG. 5 is another sectional view illustrating a mechanically operated release mechanism.

An alternative mechanical release system is illustrated in FIG. 5. In this release system the release lever 36 and actuating lever 16 remain the same, except that the end 44 of the release lever is attached by a release cable override spring 52 to a release cable 54 which is preferably attached for operation with the clutch. In this embodiment operation of the clutch cable 54 is operated, pulling down on release lever 36, disengaging the locking arm 18 from the cog.

As described above, the system operates by actuating the lever 16 on the throttle control housing 10 by depressing it with a thumb or finger. When the actuating lever 16 is depressed, the spring-loaded locking arm 18 drops into a slot or tooth on the cog section 22. When the release lever 36 is operated by any of the systems described above, the locking arm is released from the cog section 22, reloading the locking arm spring 38 and allowing the throttle to return to a closed position. To increase the speed of the motorcycle while the unit or throttle control is in a speed set, the locking arm 18 and cog section 22 operate on a ratchet advance principle.

Thus, there has been disclosed a motorcycle throttle control and speed setting apparatus which is easy to install and use and provides a number of safety methods for disengaging or releasing the throttle setting. The selected speed may be cancelled in three different ways. By mechanically pressing a button disengaging the locking arm from the cog at which the speed has been set, by operation of the brake lever which electrically operates the release arm disengaging the locking arm, or by overriding the mechanism by force to twist the throttle to a closed position. In addition, an alternate method of disengaging the locking arm with the release lever is shown by means of a cable system connected to the clutch lever on the motorcycle. While the invention is shown with the ratchet cog section rigidly mounted on the handle bars and the locking lever and housing mounted for rotation with the throttle handle grip, this arrangement could obviously be reversed. That is, the locking arm housing could be rigidly mounted on the handle bar with the ratchet cog mounted for rotation with the throttle handle grip. The preferred form, however, is as illustrated in FIG. 1.

Obviously, many modifications and variations of the invention are possible in light of the above teachings. It is therefore to be understood that the full scope of the invention is not limited to the details disclosed herein and may be practiced otherwise than as specifically described.

What is claimed is:

1. A motorcycle throttle control apparatus in which a motorcycle has handlebars and a rotatable throttle handle grip;
   a locking arm secured to said grip for rotation thereof;
   a toothed cog rigidly secured to said handlebars;
   means biasing said locking arm into engagement with said cog whereby said grip may be locked at an open position;
   release means for releasing said locking arm from engagement with said cog;
   latch means for latching said locking arm out of engagement with said cog;
   actuating means for actuating said locking arm by disengaging said latch means;
   said release means comprising:
   a release lever in said housing adapted to engage one end of said pivoted locking arm; and
   operating means for operating said release lever whereby said operating means causes said locking arm to be released from said cog and engaged by said latch means;
   whereby said grip may rotate to a closed position.

2. The throttle control apparatus according to claim 1 wherein said operating means comprises a manually-operated release button attached to said release lever.

3. The throttle control apparatus according to claim 1 wherein said operating means comprises:
   a solenoid attached to one end of said release lever; and
   energizing means for energizing said solenoid for operation of said release lever.

4. The throttle control apparatus according to claim 3 wherein said energizing means comprises:
   connecting means connecting said solenoid for operation through a brake switch on said motorcycle.

5. The throttle control apparatus according to claim 4 wherein said connecting means comprises:
   a relay;
   the contacts of said relay connected to said solenoid;
   the coil of said relay connected for operation by said brake switch whereby operation of said brake switch activates said relay to operate said solenoid.

6. The throttle control apparatus according to claim 1 wherein said operating means comprises a cable attached to one end of said release lever.

7. The throttle control apparatus according to claim 6 wherein said cable is connected for operation by a clutch shift lever.

8. The throttle control apparatus according to claim 5 including:
   switch means for disconnecting said solenoid from said energizing means when said locking arm is released.

9. The throttle control apparatus according to claim 8 wherein:
   said switch means is mounted in said housing for mechanical engagement with said locking arm whereby said locking arm disconnects said switch.

* * * * *